A. P. SCHNELL.
GRANARY.
APPLICATION FILED MAR. 26, 1913.
1,131,558.
Patented Mar. 9, 1915.
2 SHEETS—SHEET 1.
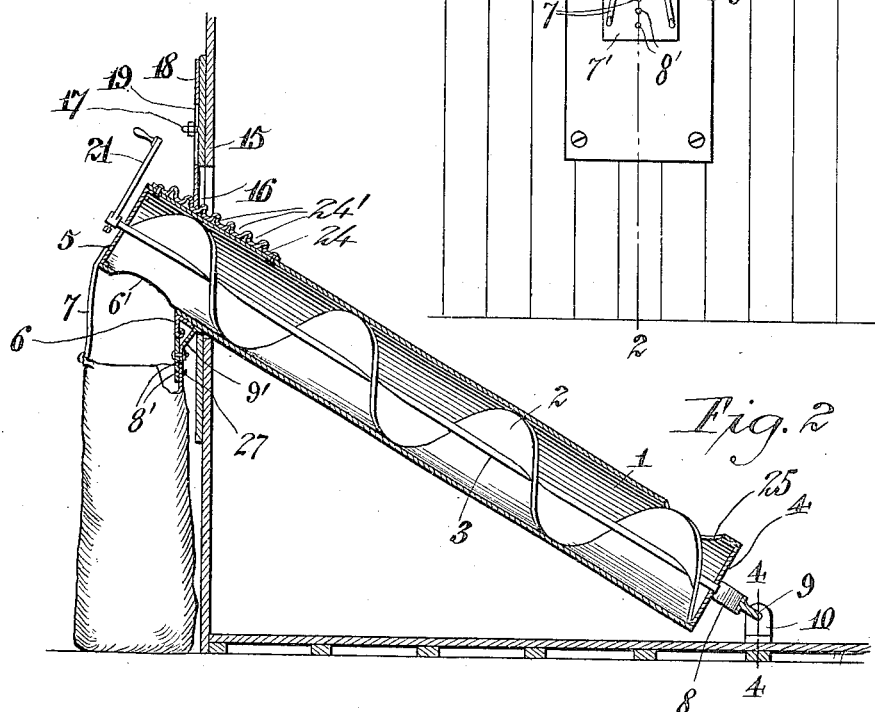
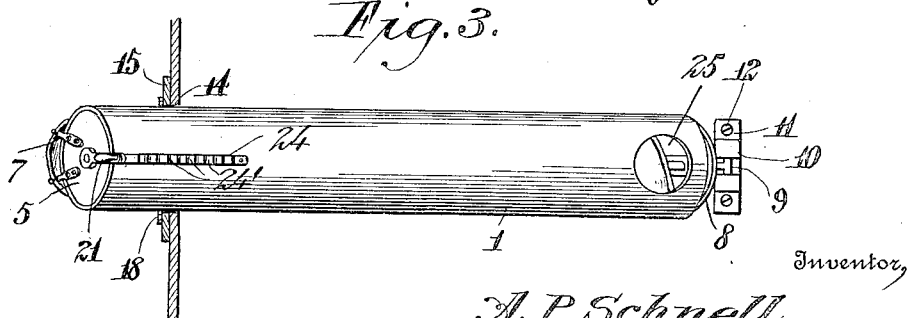
Inventor,
A. P. Schnell.
By Victor J. Evans,
Attorney.

A. P. SCHNELL.
GRANARY.
APPLICATION FILED MAR. 26, 1913.

1,131,558.

Patented Mar. 9, 1915.
2 SHEETS—SHEET 2.

Witnesses:
Christ Feinle, Jr.

Inventor,
A. P. Schnell.
By Victor J. Evans,
Attorney.

UNITED STATES PATENT OFFICE.

ALBERT P. SCHNELL, OF GRANGEVILLE, IDAHO.

GRANARY.

1,131,558. Specification of Letters Patent. Patented Mar. 9, 1915.

Application filed March 26, 1913. Serial No. 756,958.

*To all whom it may concern:*

Be it known that I, ALBERT P. SCHNELL, a citizen of the United States, residing at Grangeville, in the county of Idaho and State of Idaho, have invented new and useful Improvements in Granaries, of which the following is a specification.

This invention relates to granaries or receptacles for grain, shelled corn and the like, and it has for its object to provide a simple and efficient device for removing the contents of the same.

Receptacles for grain and shelled corn are usually provided with an aperture near the bottom thereof and with a slide fitted to said aperture and constituting a closure which may be open entirely or to any desired extent for the purpose of permitting the contents of the receptacle to escape. Devices of this kind are objectionable because various animals will soon learn to open the slide, thus permitting the contents to escape.

The principal object of the present invention is to provide a simple and efficient device whereby the escape of the contents may be governed and regulated and which will prevent accidental or unauthorized operation thereof.

A further object of the invention is to provide an emptying device in the nature of a screw conveyer operating within a convenient casing whereby material may be taken from a point adjacent to the bottom of the bin or receptacle and be elevated to the desired height and there discharged.

A still further object of the invention is to provide for the adjustment of the emptying device to suit various circumstances.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 4:
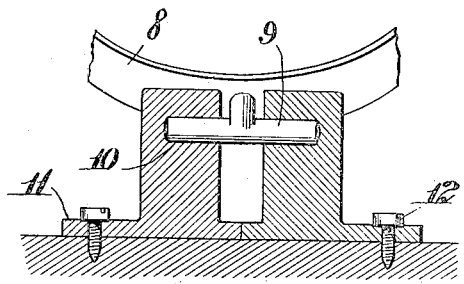
Figure 5:
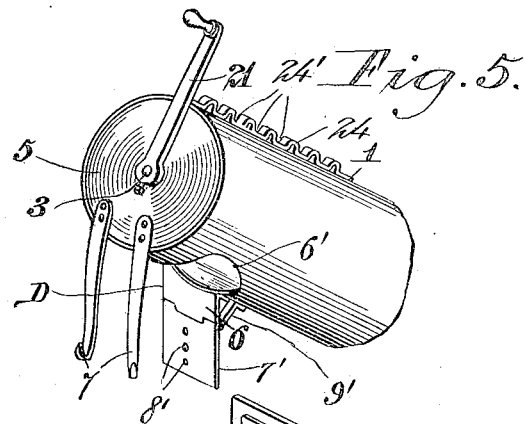
Figure 6:
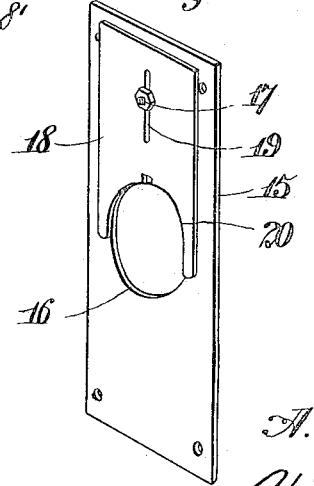

In the drawings,—Figure 1 is a front view of a bin or granary equipped with the improved device. Fig. 2 is a vertical sectional view taken on the line 2—2 in Fig. 1. Fig. 3 is a plan view of the emptying device, showing the same in position for operation and with the wall in section. Fig. 4 is a sectional view taken on the line 4—4 in Fig. 2. Fig. 5 is a perspective detail view of the front portion of the screw casing. Fig. 6 is a detail view of the means whereby the screw casing is held in position for operation.

Corresponding parts in the several figures are denoted by like characters of reference.

The improved device includes a cylindrical casing 1, wherein a conveyer screw 2 mounted on a shaft 3 is arranged for operation, said shaft being journaled in the heads 4, 5 at the lower and upper ends of the casing. The casing is also provided adjacent to its upper end with a discharge spout D and with a plurality of hooks 7, the latter being constructed preferably of steel or other suitable resilient material, and said hooks being riveted or otherwise secured on the head 5 at the upper end of the casing. The discharge spout comprises a flange 6 which is riveted or otherwise secured adjacent to a discharge opening 6'. A lip 7', which is hingedly connected with the flange 6, is provided with a plurality of apertures 8' to enable it to be connected adjustably by means of an adjusting member such as a brace or rod 9' with the underside of the casing. It is obvious that the lip 7' may be secured at various angles with respect to the underside of the casing, thus enabling bags of various dimensions to be supported by means of said lip in connection with the resilient hooks 7, as will be most clearly seen by reference to Fig. 1 of the drawings.

The casing 1 is provided adjacent to its lower end with a yoke 8 having a T-head 9 for the reception of which a socket member 10 is provided, said socket member being provided with a flange 11 which is apertured for the passage of fastening members, such as screws 12, whereby it may be secured upon the floor of the bin of the receptacle. Such fastening members may, however, be omitted; especially when it is desirable to occasionally change the location of the device. It is obvious that the socket member may be made of such a shape and dimensions that when fastening screws are not employed it will rest securely on the floor without danger of tilting or upsetting. The T-head 9 and the socket 10 combine to form a hinge whereby the casing is connected with the floor in such a manner that the upper or free end of the casing may be moved in an arc about the axis of the T-head 9. The front wall of the bin is provided with an opening 14 partly obstructed by a metallic plate 15 having an oblong vertical slot 16 through which the upper end of the casing 1 extends. Connected adjustably with the plate 15 by means of a bolt 17 is a slide 18 having a slot 19 for the passage of the bolt and provided at its lower edge with an arcuate recess 20 engaging the portion of the casing that extends through the slot 16 and coöperating therewith to make a tight joint and also to secure the casing at various adjustments.

Secured on the upper side of the casing 1 is a corrugated strip 23 of sheet metal or other suitable material the same having a series of recesses 24 to receive the lower edge of the slide 18 as will be best seen in Fig. 1 of the drawing, said slide serving to support the casing in adjusted position. The casing is provided near its lower end with an aperture 25 constituting an inlet for the grain that is to be transferred to a bag or other receptacle.

The shaft 3 is provided at its upper end with a crank 21 whereby it may be conveniently rotated.

From the foregoing description taken in connection with the drawings hereto annexed the operation and advantages of this invention will be readily understood.

It will be seen that the improved device is capable of being conveniently arranged in connection with any bin, granary or other receptacle of ordinary construction having a front wall through which the upper part of the casing may be projected. It will also be seen that when a device is placed in position, by rotating the shaft carrying the screw conveyer, the contents of the bin will be taken from adjacent to the floor thereof and will be elevated through the cylindrical casing and discharged through the spout near the upper end of the latter into a receptacle, such as a box placed underneath or a sack suspended adjacent to the spout by means of the hooks 7, said bag being also sustained by engagement with a prong or barb 27 on the rear side of the leaf 6′ as seen Fig. 1. The escape of material from the bin may thus be absolutely controlled, and waste prevented, and it is also evident that leakage will be practically impossible.

The crank 21 may be connected detachably with the shaft and may be removed when the device is not in use so as to prevent the accidental or unauthorized operation thereof.

The device may be easily and quickly adjusted to enable material to be discharged at the desired elevation, and the material being taken from adjacent to the bottom of the bin, it is evident that the bin may be practically completely emptied by the use of the improved device.

Having thus described the invention, what is claimed as new, is:—

1. The combination with a bin constituting a grain receptacle having a front wall provided with an aperture and a plate obstructing said aperture and having an oblong opening, of a cylindrical casing, said casing projecting through the oblong slot, a corrugated strip on the upper side of the casing, means for hingedly supporting the lower edge of the casing, a slide adjustable on the slotted plate and having an arcuate recess at its lower edge, said plate adapted to engage the corrugated strip to retain the casing in adjusted position and to obstruct the slot, and a screw conveyer supported for rotation in the casing; the latter being provided with a discharge spout at its upper end and with an inlet aperture at its lower end.

2. A bin constituting a grain receptacle, said bin having an opening in the front wall thereof and a plate obstructing said opening and having an oblong slot, a cylindrical casing, said casing extending through the oblong slot, a corrugated strip secured on the casing, a slide adjustably mounted on the slotted plate and engaging the corrugated strip, and a screw conveyer supported for rotation in the casing; the latter being provided at one end with an inlet aperture and at the other end with discharge spout consisting of a fixed flange, a leaf hingedly connected therewith, and a brace to secure said leaf at various adjustments.

In testimony whereof I affix my signature in presence of two witnesses.

ALBERT P. SCHNELL.

Witnesses:
CLARENCE G. SCHNEADEKER,
M. M. MOORE.